| United States Patent [19] | [11] Patent Number: 4,677,788 |
|---|---|
| Mastandrea | [45] Date of Patent: Jul. 7, 1987 |

[54] SUPPORT FOR TOMATO PLANTS AND THE LIKE

[76] Inventor: Frank Mastandrea, 300 Hamilton Rd., Pittsburgh, Pa. 15234

[21] Appl. No.: 792,281

[22] Filed: Oct. 28, 1985

[51] Int. Cl.⁴ .............................................. A01G 17/06
[52] U.S. Cl. ......................................... 47/47; 47/48.5
[58] Field of Search ............... 47/44, 45, 46, 47, 48.5, 47/82, 83, 81, 80; 248/159; 403/109, 359; 623/35

[56] References Cited

U.S. PATENT DOCUMENTS

| 122,952 | 1/1872 | McDonald | 47/47 |
|---|---|---|---|
| 1,824,682 | 9/1931 | O'Neil | 248/159 |
| 2,041,370 | 5/1936 | Pottorff | 248/159 |
| 2,082,712 | 6/1937 | McIuor | 47/47 |
| 3,069,918 | 12/1962 | Schultz, Jr. | 403/359 |
| 3,142,935 | 8/1964 | Campos | 47/47 |
| 3,339,752 | 9/1967 | Trogan | 248/159 |
| 4,048,752 | 9/1977 | Anderson | 47/47 |
| 4,513,938 | 4/1985 | Seymore | 403/109 |
| 4,584,792 | 4/1986 | Etzel | 47/47 |

*Primary Examiner*—Robert A. Hafer
*Assistant Examiner*—Bradley M. Lewis
*Attorney, Agent, or Firm*—William J. Ruano

[57] ABSTRACT

A support for tomato plants and the like to reinforce them while growing. It is preferably of plastic material having a bottle shape with an elongated neck. Such neck is progressively increased in diameter from the top to the base portion. At the points of increasing diameter, there is a shoulder serving as a stop for a slip-fitted neck portion. On the shoulder, is supported a wheel-like ring onto which the plants may be tied. Several such rings of increasing diameter of sleeve are provided. The neck instead may be progressively tapered downwardly and outwardly with the wheel-like rings held in place by the taper. Holes are provided at a distance above the bottom of the base portion to provide a reservoir of water for stabilizing the tube in the soil.

6 Claims, 6 Drawing Figures

SUPPORT FOR TOMATO PLANTS AND THE LIKE

This invention relates to a support for tomato plants and the like for reinforcing them while growing.

BACKGROUND OF THE INVENTION

An outstanding disadvantage of conventional supports for tomato plants, and the like, is that they do not have a sufficiently sturdy base structure—also, suitable rings cannot be easily applied or assembled to the main post—also, they do not permit adequate watering.

SUMMARY OF THE INVENTION

An object of the present invention is to provide a novel tomato plant pole that is devoid of the above-named disadvantages.

A more specific object of the invention is to provide a support for tomato plants and the like which can be easily and inexpensively manufactured, as well as easily assembled and which will offer adequate base support as well as watering or fertilizing of the supported plant directly to its roots.

DESCRIPTION OF THE PREFERRED EMBODIMENT

Figure 5:
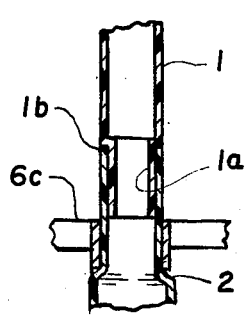
FIG. 5 is a fragmentary enlarged vertical cross-sectional view of a joint in FIG. 1.
Figure 4:
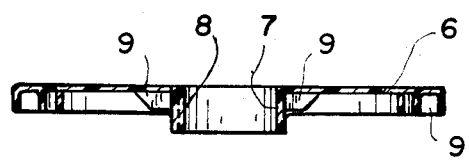
FIG. 4 is a cross-sectional view taken along line 4—4 of FIG. 3.

Referring more particularly to FIGS. 1 to 5 inclusive of the drawing, numeral 1 denotes a hollow tube, preferably of plastic material, such as polypropylene formed in telescoping parts, as noted in FIG. 5, wherein the reduced diameter inner portion 1a of tube portion 1 telescopically fits into the lower tube portion 1b having a shoulder portion which enlarges the diameter to form tube 2 which limits downward movement of portion 1b. It will be noted in going from top to bottom of FIG. 1, that the diameter of the support tube 1 progressively increases such as that of tube 2 and at the point of enlargement of the diameter, a ring portion, such as 6, is supported by the shoulder 2.

Any number of rings, such as 6a, 6b, 6c and 6d may be provided, from top to bottom, supported on lower portions of enlarged diameter, as shown in FIG. 5. These rings are all slid easily into place by having rib portions 4,4,4, (FIG. 2), which not only reinforce the tube, but provide suitable vertical guides for enlargement 8 of sleeve 7 of the rings. Such rings are reinforced by webs, such as 9, along the perimeter as well as the radius of the ring 6.

Figure 1:
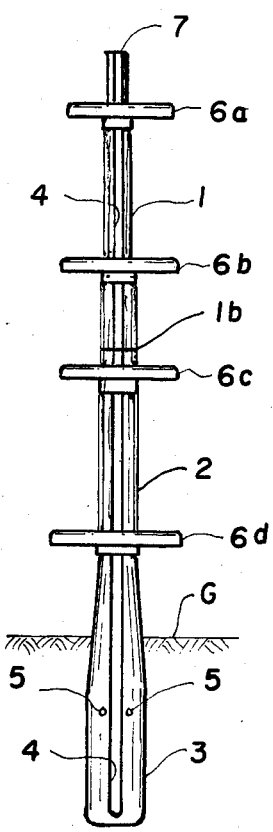
FIG. 1 is an elevational view of a support for tomato plants and the like embodying my invention.
Figure 2:
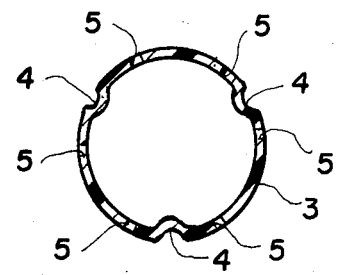
FIG. 2 is an enlarged cross-sectional view of the base portion thereof.
Figure 3:
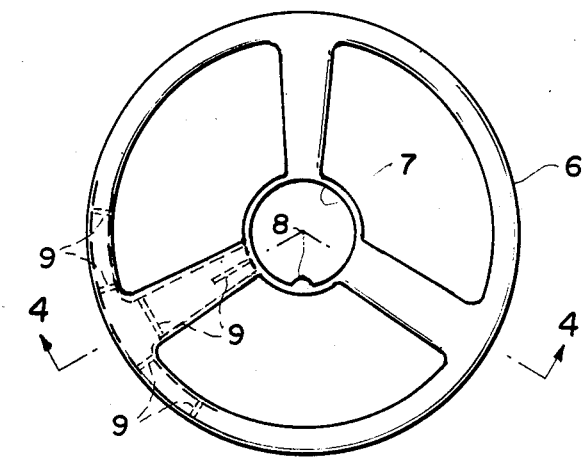
FIG. 3 is an enlarged top view of one of the rings shown in FIG. 1.

As best shown in FIG. 1, the integral plastic base portion 3 of the tube 1,2 is substantially enlarged in diameter and provide vertical grooves 4 which are extensions of those in the upper tube. Holes 5 are provided to limit the height of water that is fed into the ground G by pouring through the top opening 7 of tube 1. Therefore, the plant is effectively watered through openings 5 and a reservoir of water having the height of holes 5 constantly remains in the tube 3 to provide a sturdy support in the soil.

In operation, the plants are planted around the tube 1 and tied to the various rings 6a, 6b, 6c and 6d, in a well known manner. Three or more plants may be supported on these rings.

Figure 6:
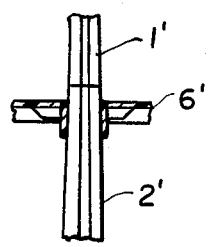
FIG. 6 is a vertical cross-sectional view of a modification.

A modification of the invention is shown in FIG. 6 wherein instead of providing shoulder portions in different sections of the tube, the tube $1^1$ is progressively tapered downwardly and outwardly to a portion $2^1$ of larger diameter which limits downward movement of the ring by virtue of a downward and outward taper of sleeve $6^1$. Thus the various rings are slid into place as determined by the internal diameter of sleeve $6^1$ and other sleeves, it being noted that each of the rings will have different internal diameters so as to fit at spaced heights of the tube. Square or polygonal rings may be used instead.

Thus it will be seen that I have provided a novel support for tomato plants and the like which can be immersed either in the outside ground or into a vase with the assurance of sufficient watering of the plant as well as sufficient stability of the base.

While I have illustrated and described several embodiments of my invention, it will be understood that these are by way of illustration only and that various changes and modifications may be contemplated in my invention and within the scope of the following claims.

I claim:

1. A support for tomato and other plants, comprising an elongated bottle-like plastic container having a top portion which is progressively increased in diameter in a downward direction and having an enclosed base portion of maximum diameter adapted to be inserted in the ground and which base portion has perforations at a height which determines the height of a constant reservoir of water always retained for watering and for stability, the top portion of said base portion being frusto-conical, a plurality of wheel-like elements of different internal diameter removably supported and slidably fitted on said top portion in vertically spaced relationship.

2. A support as recited in claim 1 wherein said top portion comprises a plurality of tubular elements, each having a lower portion of reduced diameter slip-fitted into a lower tubular element which is enlarged in diameter, forming a shoulder portion, said wheel-like elements supported on said shoulder portions.

3. A support as recited in claim 1 having an inwardly extending rib portion extending vertically throughout the height of said support, each wheel-like element having an enlargement in the internal diameter for vertical guidance by said rib portion.

4. A support as recited in claim 1 wherein said top portion is progressively tapered downwardly and outwardly in the form of a frusto-cone.

5. A support as recited in claim 1 having a plurality of longitudinally extending rib portions, said wheel-like elements having a portion in their hub forming a longitudinally slidable interconnection with said rib portions, the spokes in said wheel-like elements being equal in number with said plurality of rib portions.

6. A support as recited in claim 5 wherein three rib portions and three spokes per wheel-like elements are provided and wherein said rib portions extend radially inwardly and said longitudinally slidable interconnection is a radially inward projection in a given location in the hub of each wheel.

* * * * *